(12) United States Patent
Burr et al.

(10) Patent No.: US 10,175,806 B2
(45) Date of Patent: Jan. 8, 2019

(54) TOUCHSCREEN FOR USE WITH FLEXIBLE DISPLAY

(71) Applicant: Intel Corporation, Santa Clara, CA (US)

(72) Inventors: Jeremy Burr, Portland, OR (US); David Browning, Portland, OR (US); Russell Aoki, Tacoma, WA (US); Saara Kamppari, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/663,679

(22) Filed: Mar. 20, 2015

(65) Prior Publication Data
US 2016/0274718 A1    Sep. 22, 2016

(51) Int. Cl.
| G06F 3/041 | (2006.01) |
| --- | --- |
| G06F 1/16 | (2006.01) |
| G09G 5/00 | (2006.01) |
| G06F 3/0488 | (2013.01) |

(52) U.S. Cl.
CPC .......... *G06F 3/0416* (2013.01); *G06F 1/1626* (2013.01); *G06F 1/1641* (2013.01); *G06F 1/1643* (2013.01); *G06F 1/1652* (2013.01); *G06F 1/1694* (2013.01); *G06F 3/0412* (2013.01); *G06F 3/04886* (2013.01); *G09G 5/00* (2013.01); *G06F 2203/04102* (2013.01)

(58) Field of Classification Search
CPC .......... G06F 1/16; G06F 3/0346; G06F 3/041; G06F 3/0416; G06F 3/0412; G06F 1/1643; G06F 1/1652; G06F 2203/04102; G06F 1/1626; G06F 1/1641; G06F 1/1694; G06F 3/04886; G09G 5/003; G09G 5/00; H05K 7/00
See application file for complete search history.

(56) References Cited

U.S. PATENT DOCUMENTS

| 2010/0064244 A1 | 3/2010 | Kilpatrick, II et al. |
| --- | --- | --- |
| 2010/0117975 A1* | 5/2010 | Cho .................. G06F 1/1626 345/173 |

(Continued)

FOREIGN PATENT DOCUMENTS

| JP | 2010-004490 A | 1/2010 |
| --- | --- | --- |
| KR | 10-2014-0044227 A | 4/2014 |

(Continued)

OTHER PUBLICATIONS

International Search Report and Written Opinion in International Application No. PCT/US2016/018818, dated May 31, 2016, 16 pages.

(Continued)

*Primary Examiner* — Lun-Yi Lao
*Assistant Examiner* — Johny Lau
(74) *Attorney, Agent, or Firm* — Patent Capital Group (57) ABSTRACT

Particular embodiments described herein provide for an electronic device, that includes a circuit board coupled to a plurality of electronic components (which includes any type of components, elements, circuitry, etc.). One particular example implementation of the electronic device may include a main housing, a flexible display, and a touchscreen, wherein regions of the touchscreen can be reconfigured based on an orientation of the flexible display.

23 Claims, 8 Drawing Sheets

(56) References Cited

U.S. PATENT DOCUMENTS

| | | | |
|---|---|---|---|
| 2013/0076649 A1* | 3/2013 | Myers | H04M 1/0268 |
| | | | 345/173 |
| 2013/0265280 A1 | 10/2013 | Burns et al. | |
| 2013/0271395 A1 | 10/2013 | Tsai et al. | |
| 2013/0285922 A1 | 10/2013 | Alberth, Jr. et al. | |
| 2014/0098075 A1* | 4/2014 | Kwak | G06F 3/0487 |
| | | | 345/204 |
| 2014/0285449 A1* | 9/2014 | Cho | G06F 3/0412 |
| | | | 345/173 |
| 2015/0153861 A1* | 6/2015 | Yamazaki | G06F 1/3265 |
| | | | 345/173 |
| 2016/0085319 A1* | 3/2016 | Kim | G06F 3/0346 |
| | | | 345/156 |

FOREIGN PATENT DOCUMENTS

| | | |
|---|---|---|
| TW | 200830234 A | 7/2008 |
| TW | I408628 | 9/2013 |
| TW | 201413498 A | 4/2014 |
| TW | 201415343 A | 4/2014 |
| WO | 2016153659 A1 | 9/2016 |

OTHER PUBLICATIONS

Office Action and Search Report from TW-105104751, dated Jun. 1, 2017, 15 pages, English translation included.

Taiwan Notice of Allowance in T.W. Patent Application Serial No. 105104751 dated Nov. 8, 2017, 3 pages with Summary of Relevance.

\* cited by examiner

TOUCHSCREEN FOR USE WITH FLEXIBLE DISPLAY

TECHNICAL FIELD

Embodiments described herein generally relate to the field of electronic devices and, more particularly, to an electronic device with a touchscreen for use with a flexible display.

BACKGROUND

End users have more electronic device choices than ever before. A number of prominent technological trends are currently afoot (e.g., more computing devices, more detachable displays, etc.), and these trends are changing the electronic device landscape. One of the technological trends is a flexible display or screen. The flexible display is any type of display that is flexible in nature. In many instances, due to the flexible nature of the display and the many possible configurations, the flexible displays do not include a touchscreen. Hence, there is a challenge in providing an electronic device that allows for a touchscreen for use with a flexible display.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

An electronic device is provided in one example embodiment and includes a main housing, a flexible display, and a touchscreen. Regions of the touchscreen can be reconfigured based on an orientation of the flexible display. The flexible display can also include a display screen and the display screen can also be reconfigured based on an orientation of the flexible display. The electronic device can further include an orientation module, where the orientation module can determine the orientation of the flexible display. The electronic device may also include a touchscreen control module, where the touchscreen control module can reconfigure the touchscreen based on the orientation determined from the orientation module.

In some embodiments, the touchscreen can be reconfigured to include null regions. Additionally, the touchscreen can be reconfigured to include at least one activator. The activators can be located on a side of the electronic device when the flexible display is bent around the main housing. In certain examples, the flexible display is bent around the main housing such that the flexible display covers at least one side of the main housing and the touchscreen includes at least one activator and at least one null region on the at least one side.

Example Embodiments

The following detailed description sets forth example embodiments of apparatuses, methods, and systems relating to detachable display configurations for an electronic device. Features such as structure(s), function(s), and/or characteristic(s), for example, are described with reference to one embodiment as a matter of convenience; various embodiments may be implemented with any suitable one or more of the described features.

Figure 1A:
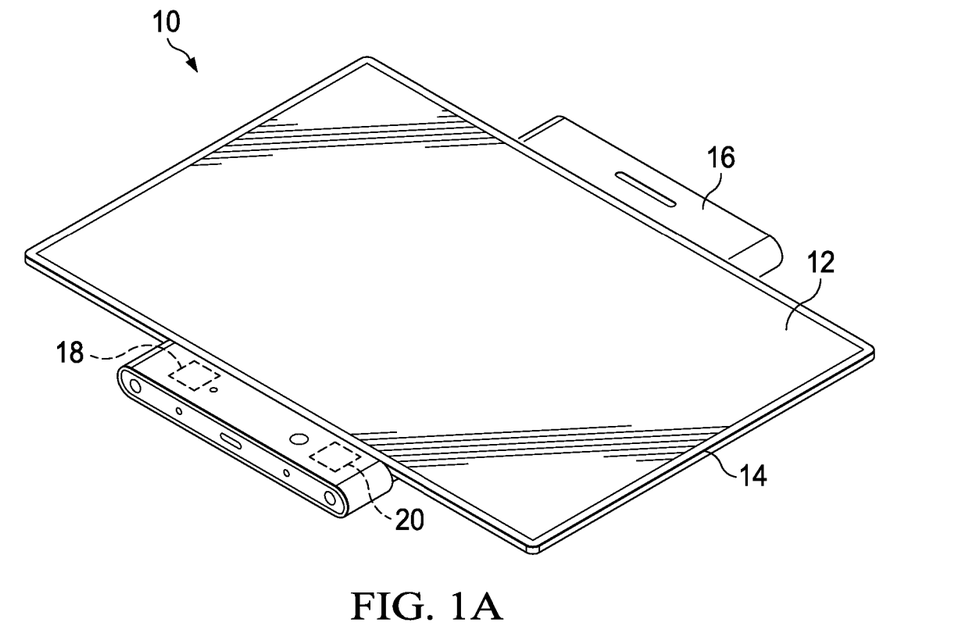
FIG. 1A is a simplified schematic diagram illustrating an embodiment of an electronic device, in accordance with one embodiment of the present disclosure.

FIG. 1A is a simplified schematic diagram illustrating an embodiment of an electronic device 10, in accordance with one embodiment of the present disclosure. Electronic device 10 may include a display 12, bezel 14, and main housing 16. Main housing 16 can include touchscreen control module 18 and orientation module 20. In one or more embodiments, electronic device 10 is a tablet computer. In still other embodiments, electronic device 10 may be any suitable electronic device having a display such as a mobile device, a tablet device (e.g., i-Pad™), Phablet™, a personal digital assistant (PDA), a smartphone, an audio system, a movie player of any type, etc. The electronics (e.g., processor, memory, etc.) for electronic device 10 reside in main housing 16.

In one or more embodiments, display 12 can be a flexible display screen such as a flexible liquid crystal display (LCD) display screen, a flexible light-emitting diode (LED) display screen, a flexible organic light-emitting diode (OLED) display screen, a flexible plasma display screen, or any other suitable flexible display screen system. Display 12 can include a touchscreen (shown in FIG. 2) that can detect the presence and location of a touch within the display area. In another embodiment, main housing 16 may include a battery and various electronics (e.g., processor, memory, etc.) to allow main housing 16 to operate as a standalone tablet. In another embodiment, main housing 16 may include a wireless module (e.g., Wi-Fi module, Bluetooth module, etc.). In yet another embodiment, main housing 16 may include a camera, a microphone, and speakers.

Figure 1B:
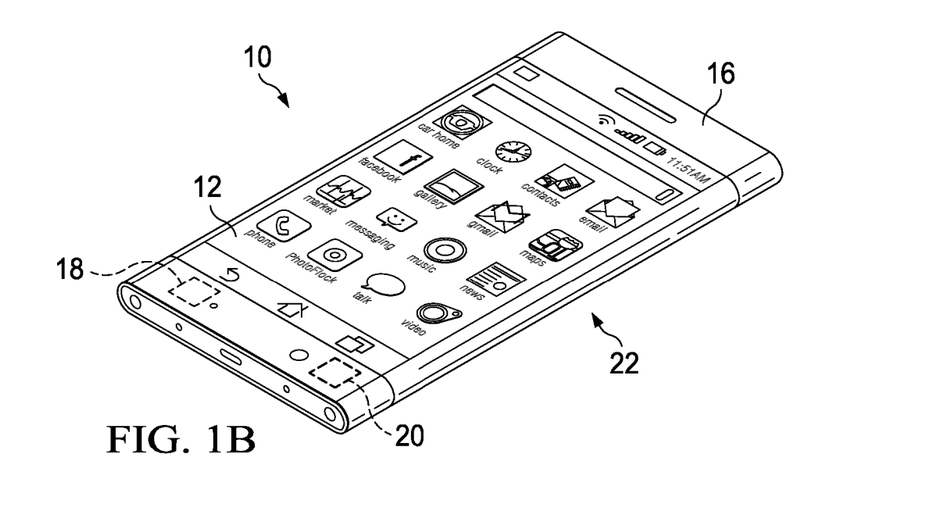
FIG. 1B is a simplified schematic diagram illustrating an embodiment of an electronic device, in accordance with one embodiment of the present disclosure.

Turning to FIG. 1B, FIG. 1B is a simplified schematic diagram of electronic device 10, in accordance with one embodiment of the present disclosure. Display 12 can be a flexible display that can wrap around main housing 16. When display 12 is wrapped around main housing 16, the display covers edge portion 22 of main housing 16 and the viewing area of display is reduced. Orientation module 20 can detect when display 12 is deformed and touchscreen control module 18 can reconfigure the image show on display 12 to conform the image to the deformation.

Figure 1C:
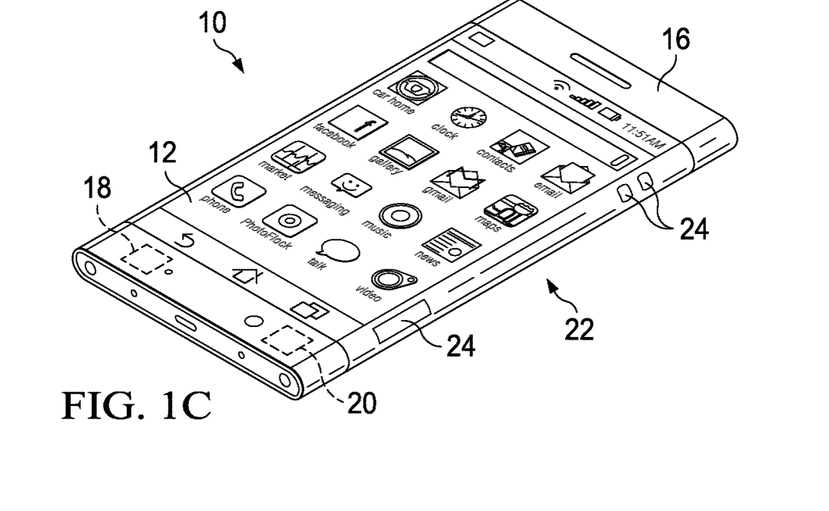
FIG. 1C is a simplified schematic diagram illustrating an embodiment of an electronic device, in accordance with one embodiment of the present disclosure.

Turning to FIG. 1C, FIG. 1C is a simplified schematic diagram of electronic device 10 in accordance with one embodiment of the present disclosure. As illustrated in FIG. 1C, display 12 has been wrapped around main housing 16 and covers edge portion 22. The portion of display that covers edge portion 22 can include one or more activators 24. Activators 24 can be used to initiate processes or functions of electronic device 10. For example, activators 24 can be configured to function as a volume control or an on/off switch.

Figure 1D:
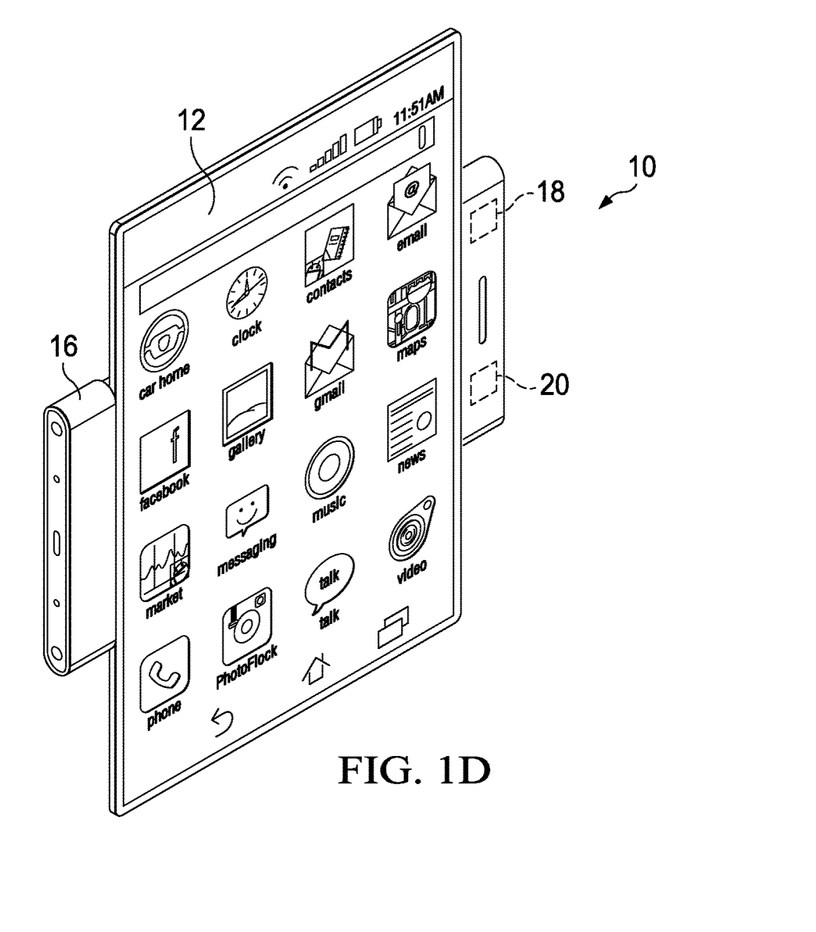
FIG. 1D is a simplified schematic diagram illustrating an embodiment of an electronic device, in accordance with one embodiment of the present disclosure.
Figure 1E:
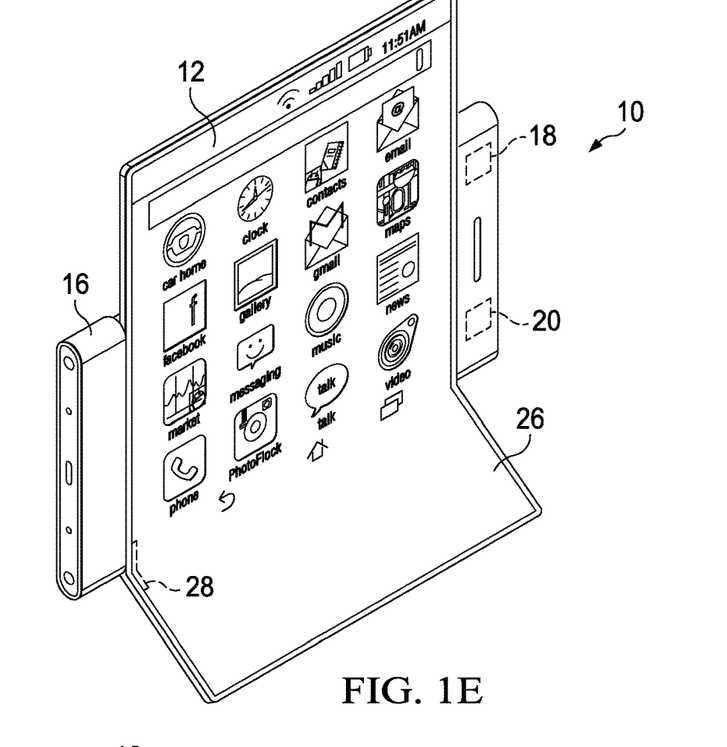
FIG. 1E is a simplified schematic diagram illustrating an embodiment of an electronic device, in accordance with one embodiment of the present disclosure.

Turning to FIG. 1D, FIG. 1D is a simplified schematic diagram of electronic device 10 in accordance with one embodiment of the present disclosure. As illustrated in FIG. 1D, electronic device is in a portrait configuration. Turning to FIG. 1E, FIG. 1E is a simplified schematic diagram of electronic device 10 in accordance with one embodiment of the present disclosure. As illustrated in FIG. 1E, display 12 has been bend or curved to create bended area 26. A sensor 28 (e.g., a strain gage) can detect when display 12 has been bent or curved. Using sensor 28, orientation module 20 can detected when display 12 is deformed and touchscreen control module 18 can reconfigure the image show on display 12 to conform the image to the deformation.

For purposes of illustrating certain example features of electronic device 10, the following foundational information may be viewed as a basis from which the present disclosure may be properly explained. A current technological trend is a flexible display or screen. The flexible display is any type of display that is flexible in nature. One problem with flexible displays is how to integrate a touchscreen into the flexible display. For example, when the display is changed or deformed, the acceptable regions for touch input on the flexible display is changed and the displayed areas and the acceptable touch regions of the flexible display must be modified. What is needed is a system that can provide contextual information about the physical orientation and configuration of a device's form factor and display orientation and modify the acceptable touch regions of the touchscreen.

A touchscreen for use with a flexible display as outlined herein can resolve these issues (and others). Particular embodiments described herein provide for an electronic device that is configured to provide contextual information about the physical orientation and configuration of a device's form factor and modify the acceptable touch regions of the touchscreen. In an example, when a flexible display is bent around a main body of an electronic device, the exposed perimeter sides of the display can be reconfigured and used as activators to activate functions of the electronic device. The displayed area may be reduced to the area of the main body and the portion of the display that now covers the perimeter side can be reconfigured to include null regions or areas that do not respond to touch input and areas that can be used as activators and respond to touch input. In an embodiment, one or more portions of the perimeter side may or may not be illuminated to show the position of the activators.

In an example, the electronic device can be configured to provide appropriate display and touchscreen regions based on the electronic device's configuration and the display can be configured to discriminate between valid and invalid touch events on the display's perimeter and contextually pass the valid touch events to the appropriate functions of the electronic device. In a specific example, when a display is flat, the display may not have a volume control visible on the display to allow a video image to take up as much of the display as possible. However, when the display is wrapped around a housing, the display can be reconfigured such that the video image does not wrap around the housing and the sides can now include a volume control.

When the active display area is changed, the system can update its state and modify the display and valid region of the touch screen to conform to the updated display region. A touchscreen control module (e.g., touchscreen control module 18) can masks the touch screen events generated in the null or invalid regions. The touchscreen control module does not mask touch screen events generated in the primary display or valid regions, but it does modify the touchscreen data to map the touch screen data to reflect the changes or deformation of the display.

The touch screen control module can be configured to analyze the analog touch screen inputs and map them into a digital representation of the human interaction with the touchscreen. This allows the CPU/PCH/platform on the electronic device to enter into low power states even when the touchscreen is receiving input (e.g., a thumb or finger of a user is pressed on the touchscreen) because the touch input is not communicated to the CPU/PCH/platform for processing. When valid touch screen input occurs in a valid or active region of the touchscreen, information can be passed from the touch screen controller about the valid touchscreen region to the pre-processing components to allow the pre-processing components to locally assess the valid/invalid human interactions with the touchscreen.

An orientation module (e.g., orientation module 20) may define multiple regions within the touchscreen that may generate valid touch screen data and these regions may have different sizes and shapes. When the flexible display is bent around the main body of the electronic device, the exposed surfaces along the perimeter of the electronic device are exposed. These perimeter surfaces can be used for human interface device (HID) touch surfaces, such as virtual buttons or activators. The system can be configured to define the valid and invalid (or null) regions of the touch screen (which are critical for the operation of the virtual activators), how touch events generated in these regions can be discriminated (which allows the device to mask invalid events), and pass on valid touch events for further processing.

The orientation module can be used to indicate the valid regions of the flexible display. These valid regions may be the entire screen lying flat, a single sub region of the display (e.g., with the rest of the display bi-folded or tri-folded behind the display), multiple regions of the display (e.g., two of three subregions of a tri-fold display, whether at an angle like a "laptop" shape or folded flat behind the main subregion and used as rear touch panel), or single/multiple main regions with one or more smaller subregions (e.g., Edge buttons) along the perimeter edge.

The system can discriminate between valid and null touch events by defining regions within the displayed image that are valid and null regions. The touch events can be mapped into these valid and null regions and only the valid touch events are passed on and processed. Null or invalid touch events are masked and are not passed on or processed any further. As a result, non-visible regions of the display may be powered off. In an example, processing of valid touch events may cause the device to provide haptic feedback, to indicate a successful touch event.

The orientation module can determine the electronic device's current configuration, so that the touch screen control module can appropriately configure the display and touch regions for the display. The orientation module may use presence sensors to detect display closure around the main body (e.g., IR, Hall Effect, etc.), orientation sensors to detect portrait/landscape orientation of the main body (e.g., accelerometer, gyroscope, etc.) bend-angle sensors to detect partially/fully open display surfaces (e.g. Piezo-strip sensors, strain gage, etc.)

Figure 2:
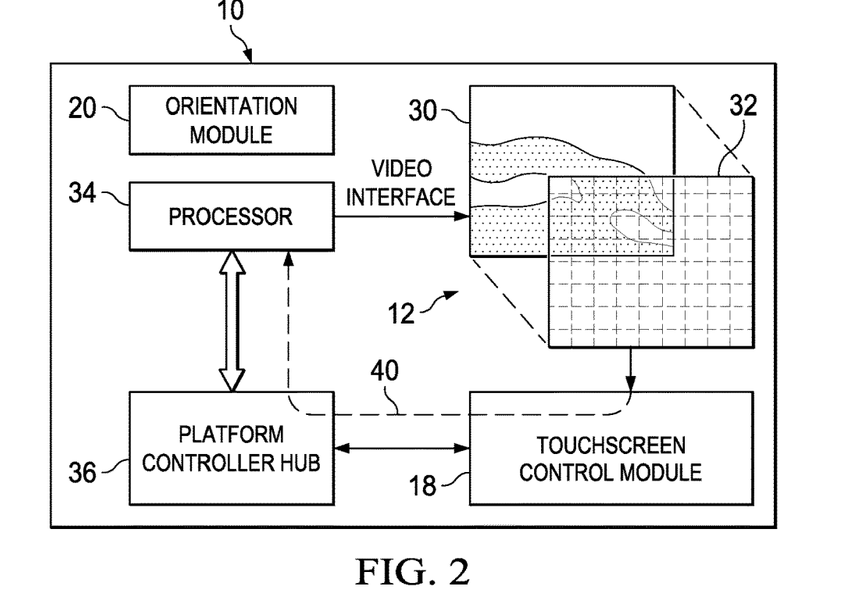
FIG. 2 is a simplified block diagram illustrating an embodiment of an electronic device, in accordance with one embodiment of the present disclosure.

Turning to FIG. 2, FIG. 2 is a simplified block diagram of electronic device 10 in accordance with one embodiment of the present disclosure. As illustrated in FIG. 2, electronic device 10 can include display 12, touchscreen control module 18, orientation module 20, a processor 34, and a platform controller hub 36. Display 12 can include a display screen 30 and a touchscreen 32. Display screen 30 can be configured to display an image to a user. Touchscreen 32 can be configured to respond to touch input from a user. Orientation module 20 can be configured to determine the orientation of display 12. Touchscreen control module 18 can be configured to configure the image on display screen 30 and the null and valid touch points or areas on touchscreen 32 based on the orientation of display 12. Platform controller hub 36 can be configured to control data paths and support functions used in conjunction with processor 34, such as clocking (e.g., a system clock), display interface, direct media interface (DMI), etc. As illustrated in FIG. 2, touchscreen 32 does not include null or invalid regions. Touch input anywhere on touchscreen 32 would produce a touch input signal 40 that would be communicated to processor 34 for an appropriate system response.

Figure 3:
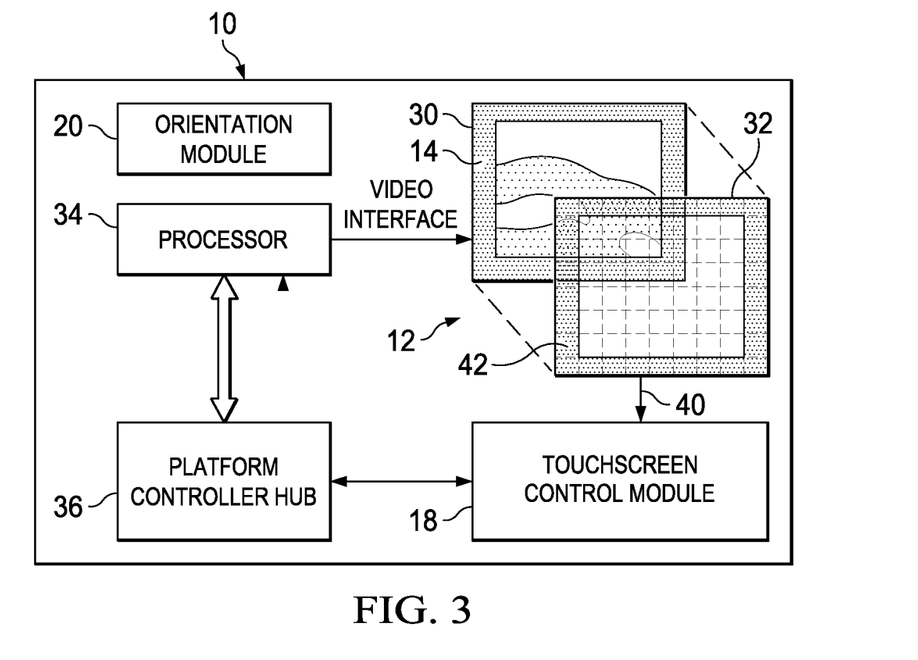
FIG. 3 is a simplified block diagram illustrating an embodiment of an electronic device, in accordance with one embodiment of the present disclosure.

Turning to FIG. 3, FIG. 3 is a simplified block diagram of electronic device 10 in accordance with one embodiment of the present disclosure. Display 12 can include bezel 14. Touchscreen 32 can include null region 42. Null region 42 can match the area covered by bezel 14 so touch input anywhere in null region 42 (on bezel 14) would not generate a system response. For example, as illustrated in FIG. 3, when a user touches null region 42, touch input signal 40 is sent to touchscreen control module 18, however, touchscreen control module 18 does not communicate touch input signal 40 to processor 34. This allows touch input on a bezel (e.g., bezel 14) or an otherwise inactive or null portion of display 12 to not be sent to processor 34.

Figure 4:
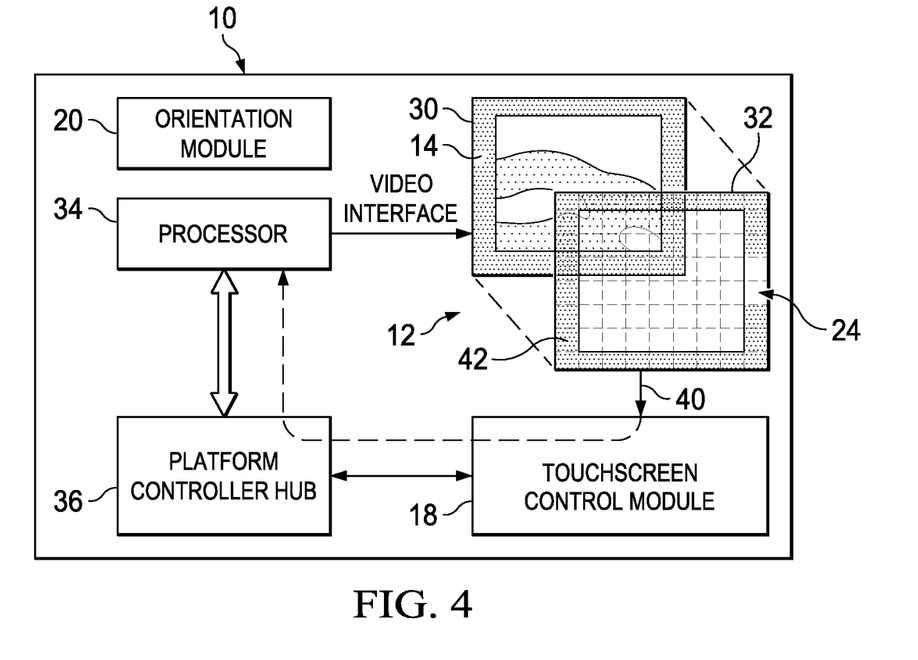
FIG. 4 is a simplified block diagram illustrating an embodiment of an electronic device, in accordance with one embodiment of the present disclosure.

Turning to FIG. 4, FIG. 4 is a simplified block diagram of electronic device 10 in accordance with one embodiment of the present disclosure. Touchscreen 32 can include activator 24 and null region 42. When a user touches activator 24, touch input signal 40 is sent to touchscreen control module 18 and touchscreen control module 18 communicates touch input signal 40 to processor 34.

Figure 5:
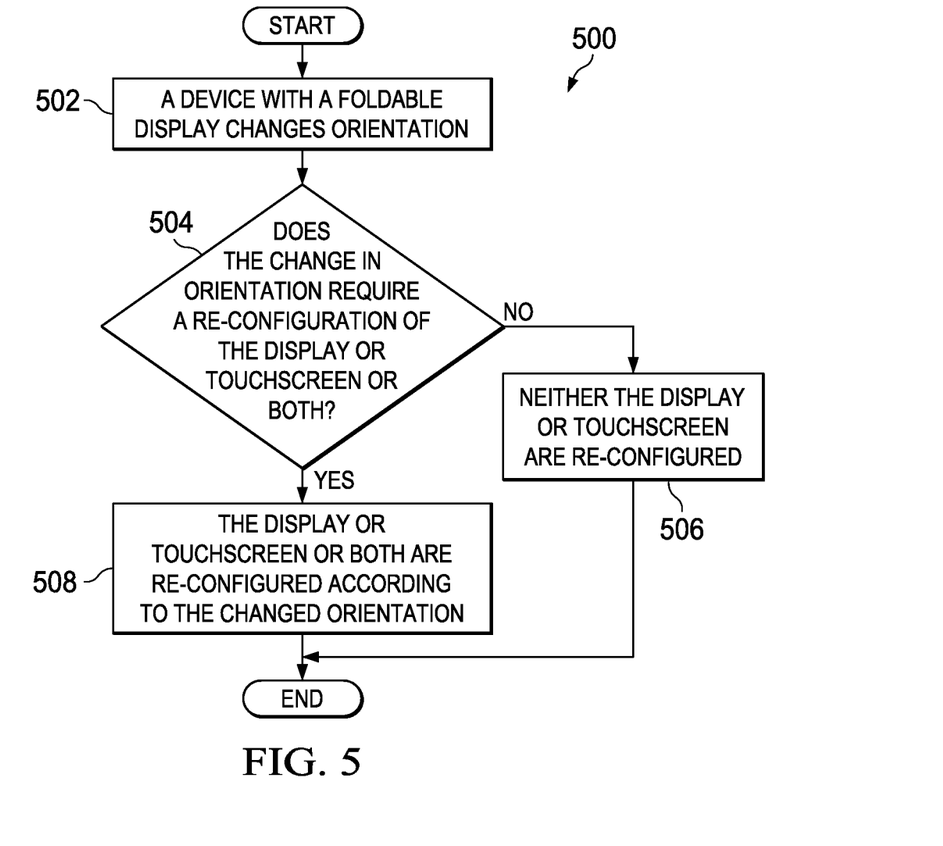
FIG. 5 is a simplified a simplified flow diagram illustrating potential operations associated with one embodiment of the present disclosure.

Turning to FIG. 5, FIG. 5 is an example flowchart illustrating possible operations of a flow 500 that may be associated with a touchscreen for use with a flexible display, in accordance with an embodiment. In an embodiment, one or more operations of flow 500 may be performed by touchscreen control module 18 and orientation module 20. At 502, a device with a foldable display changes orientation. At 504, the system determines if the change in orientation requires a reconfiguration of the display or touchscreen or both. If the change in orientation does not require a reconfiguration of the display or touchscreen or both, then neither the display or touchscreen are reconfigured, as in 506. If the change in orientation does require a reconfiguration of the display or touchscreen or both, then the display or touchscreen or both are reconfigured according to the changed orientation, as in 508.

Figure 6:
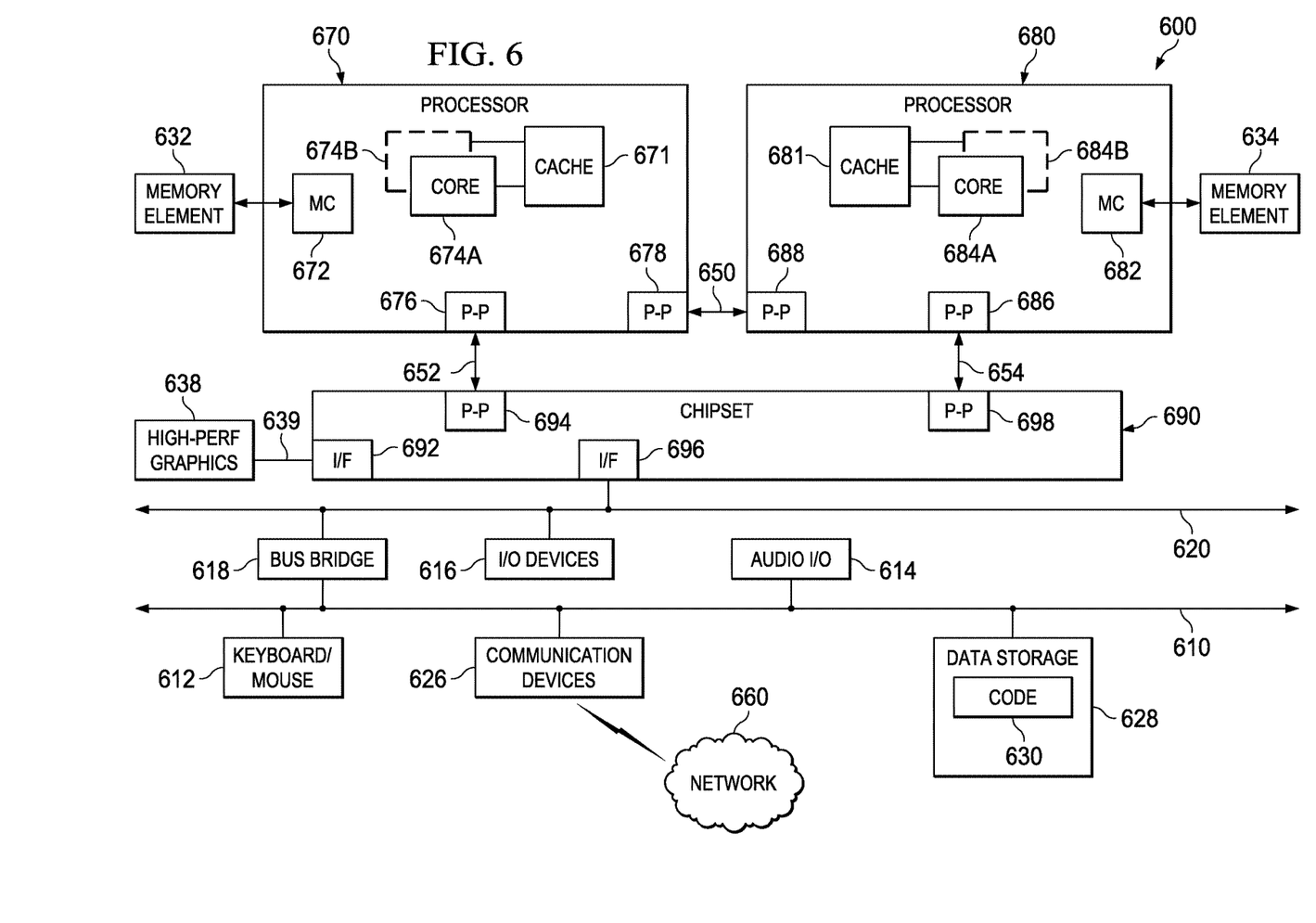
FIG. 6 is a block diagram illustrating an example computing system that is arranged in a point-to-point configuration in accordance with an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, electronic device 10 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
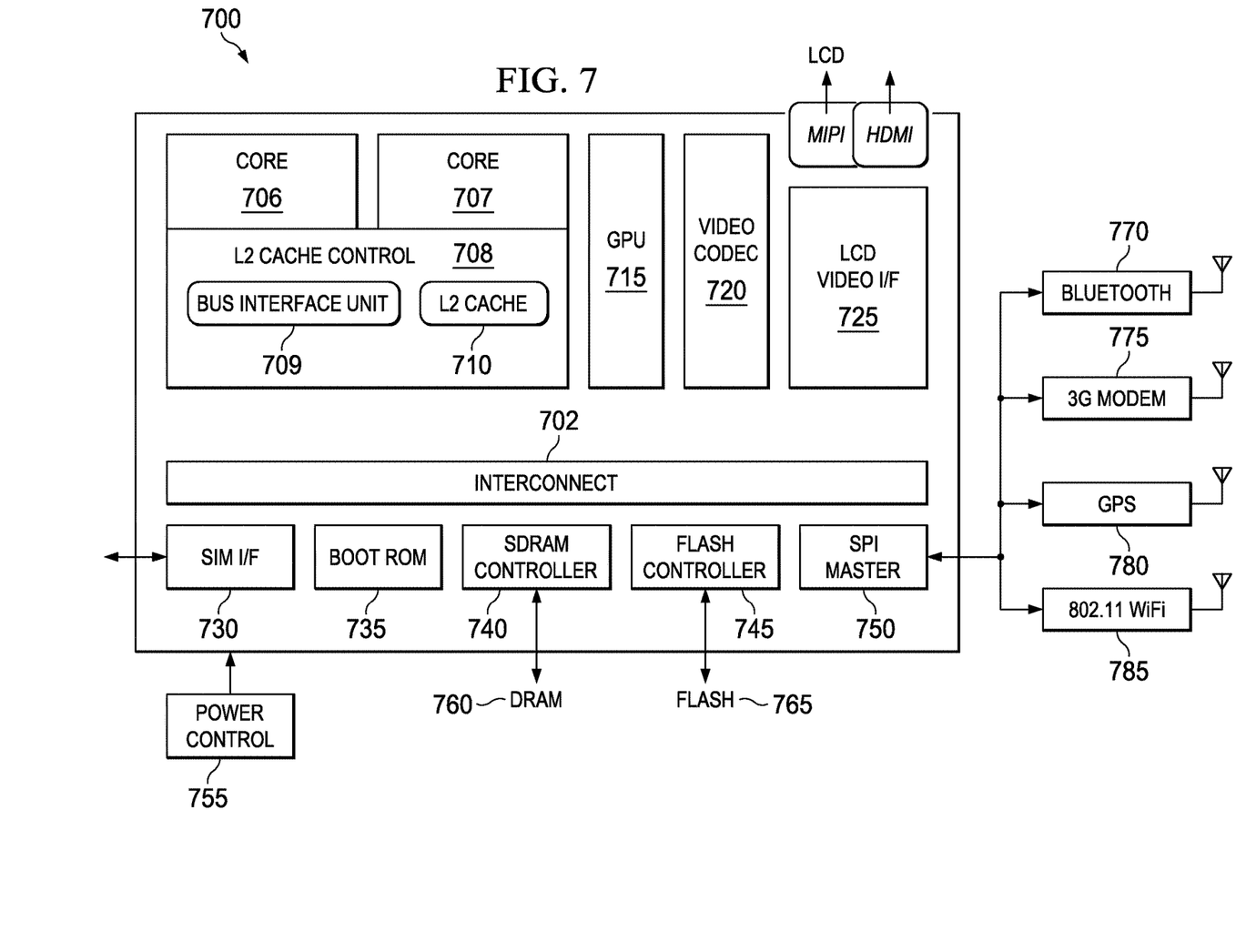
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the touch screen features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
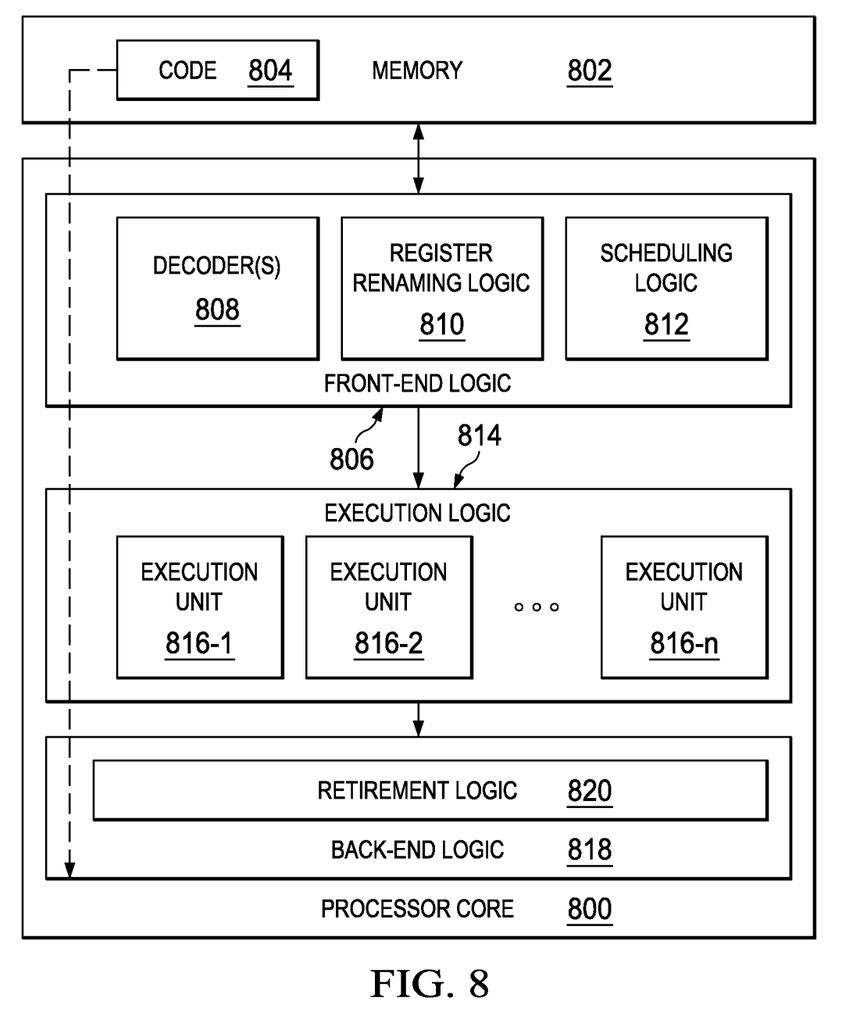
FIG. 8 is a block diagram illustrating an example processor core in accordance with an embodiment.

FIG. 8 illustrates a processor core 800 according to an embodiment. Processor core 800 may be the core for any type of processor (e.g., processor 34), such as a microprocessor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 674a, and 674b shown and described with reference to processors 670 and 680 of FIG. 7. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagram (i.e., FIG. 5) illustrate only some of the possible correlating scenarios and patterns that may be executed by, or within, electronic device 10. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 10 has been illustrated with reference to particular elements and operations that facilitate the communication process, these elements and operations may be replaced by any suitable architecture, protocols, and/or processes that achieve the intended functionality of electronic device 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is an electronic device that includes a flexible display, and a touchscreen, where regions of the touchscreen can be reconfigured based on an orientation of the flexible display.

In Example A2, the subject matter of Example A1 may optionally include where the flexible display includes a display screen and the display screen can be reconfigured based on an orientation of the flexible display.

In Example A3, the subject matter of any of the preceding 'A' Examples can optionally include an orientation module, where the orientation module can determine the orientation of the flexible display.

In Example A4, the subject matter of any of the preceding 'A' Examples can optionally include a touchscreen control module, where the touchscreen control module can reconfigure the touchscreen based on the orientation determined from the orientation module.

In Example A5, the subject matter of any of the preceding 'A' Examples can optionally include where the touchscreen is reconfigured to include null regions.

In Example A6, the subject matter of any of the preceding 'A' Examples can optionally include where the touchscreen is reconfigured to include at least one activator.

In Example A7, the subject matter of any of the preceding 'A' Examples can optionally include where the activators are located on a side of the electronic device when the flexible display is configured around a main housing.

In Example A8, the subject matter of any of the preceding 'A' Examples can optionally include where the flexible display is configured around a main housing such that the flexible display covers at least one side of the main housing and the touchscreen includes at least one activator and at least one null region on the at least one side.

Example M1 is a method that includes reconfiguring a flexible display, where the flexible display includes a touchscreen and reconfiguring the touchscreen based on the reconfigured orientation of the flexible display.

In Example M2, the subject matter of any of the preceding 'M' Examples can optionally include where the flexible display includes a display screen and the display screen can be reconfigured based on an orientation of the flexible display.

In Example M3, the subject matter of any of the preceding 'M' Examples can optionally include determining an orientation of the flexible display using an orientation module.

In Example M4, the subject matter of any of the preceding 'M' Examples can optionally include where the touchscreen is reconfigured using a touchscreen control module, where the touchscreen control module can reconfigure the touchscreen based on the orientation determined from the orientation module.

In Example M5, the subject matter of any of the preceding 'M' Examples can optionally include where the touchscreen is reconfigured to include null regions.

In Example M6, the subject matter of any of the preceding 'M' Examples can optionally include where the touchscreen is reconfigured to include at least one activator.

In Example M7, the subject matter of any of the preceding 'M' Examples can optionally include bending the flexible display around a main housing such that the flexible display covers at least one side of the main housing and the touchscreen includes at least one activator and at least one null region on the at least one side.

Example AA1 can include an electronic device that includes a flexible display, a touchscreen, an orientation module, where the orientation module can determine the orientation of the flexible display, and a touchscreen control module, where the touchscreen control module can reconfigure the touchscreen based on the orientation determined from the orientation module.

In Example AA2, the subject matter of any of the preceding 'AA' Examples can optionally include where the touchscreen is reconfigured to include null regions.

In Example AA3, the subject matter of any of the preceding 'AA' Examples can optionally include where the activators are located on a side of the electronic device when the flexible display is bent around a main housing.

In Example AA4, the subject matter of any of the preceding 'AA' Examples can optionally include where the flexible display is configured around a main housing such that the flexible display covers at least one side of the main housing and the touchscreen includes at least one activator and at least one null region on the at least one side.

An example system S1 can include means for reconfiguring a flexible display, where the flexible display includes a touchscreen and means for reconfiguring the touchscreen based on the reconfigured flexible display.

In Example S2, the subject matter of any of the preceding 'S' Examples can optionally include where the flexible display includes a display screen and the display screen can be reconfigured based on an orientation of the flexible display.

In Example S3, the subject matter of any of the preceding 'S' Examples can optionally include where the touchscreen is reconfigured using a touchscreen control module, where the touchscreen control module can reconfigure the touchscreen based on the orientation determined from the orientation module.

In Example S4, the subject matter of any of the preceding 'S' Examples can optionally include where the touchscreen is reconfigured to include null regions.

In Example S5, the subject matter of any of the preceding 'S' Examples can optionally include where the touchscreen is reconfigured to include at least one activator.

In Example S6, the subject matter of any of the preceding 'S' Examples can optionally include means for configuring the flexible display around a main housing such that the flexible display covers at least one side of the main housing and the touchscreen includes at least one activator and at least one null region on the at least one side.

Example X1 is a machine-readable storage medium including machine-readable instructions to implement a method or realize an apparatus as in any one of the Examples A1-A8, M1-M7, and AA1-AA4. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
   a rigid main housing;
   a flexible display at least partially over the main housing, wherein a display side of the flexible display faces away from the main housing, wherein the flexible display can wrap around the main housing;
   a strain gage to determine when the flexible display is wrapped around the main housing;
   a touchscreen, wherein regions of the touchscreen can be reconfigured based on an orientation of the flexible display, wherein the reconfiguration includes reconfiguring at least a portion of a first area of the touchscreen from an active area that can respond to touch input to a null area that does not respond to touch input, wherein when the electronic device is in a low power state, touch input in the null area is not communicated to a central processor of the electronic device for processing; and
   a touchscreen control module that is separate and independent from the central processor of the electronic device, wherein the touchscreen control module detects touch input on the touchscreen.

2. The electronic device of claim 1, wherein the flexible display includes a display screen and the display screen can be reconfigured based on an orientation of the flexible display.

3. The electronic device of claim 1, further comprising:
   an orientation module, wherein the orientation module can determine the orientation of the flexible display,
   wherein the touchscreen control module can reconfigure the touchscreen based on the orientation determined from the orientation module.

4. The electronic device of claim 1, wherein the touchscreen is reconfigured to include null areas and at least one activator along at least one side of the main housing, wherein the at least one activator is a volume control activator.

5. The electronic device of claim 4, wherein the at least one activator is located on a side of the main housing when the flexible display is wrapped around the main housing.

6. The electronic device of claim 1, wherein the flexible display is wrapped around the main housing such that the flexible display covers at least one side of the main housing and the touchscreen includes at least one activator and at least one null area on the at least one side.

7. The electronic device of claim 1, wherein the main housing includes a first side and a second side and the first side is opposite the second side, wherein the flexible display can wrap around the first side and the second side of the main housing.

8. The electronic device of claim 7, wherein the reconfiguration includes reconfiguring at least a portion of a second area of the touchscreen over the second side from an active area to a null area.

9. The electronic device of claim 1,
   wherein the touchscreen control module is configured to analyze analog touch screen inputs and map the touch screen inputs into a digital representation of a human interaction with the touchscreen.

10. The electronic device of claim 1, wherein when the flexible display is wrapped around the main housing, at least a portion of the flexible display is not readily visible to a user when the user is looking at a front portion of the device, wherein the portions of the flexible display that are not readily visible and include the null area are powered off.

11. A method, comprising:
    determining, using a strain gauge, when a flexible display is wrapped around a rigid main housing of an electronic device;
    reconfiguring the flexible display when the flexible display is wrapped around the main housing, wherein the flexible display includes a touchscreen at least partially over the main housing, wherein a display side of the flexible display faces away from the main housing; and
    reconfiguring the touchscreen based on the reconfigured flexible display, wherein the reconfiguration includes reconfiguring at least a portion of a first area of the touchscreen from an active area to a null area, wherein a touchscreen control module that is separate and independent from a central processor of the electronic device detects touch input on the touchscreen, wherein when the electronic device is in a low power state, touch input in the null area is not communicated to the central processor of the electronic device for processing.

12. The method of claim 11, wherein the flexible display includes a display screen and the display screen can be reconfigured based on an orientation of the flexible display.

13. The method of claim 11, further comprising:
    determining an orientation of the flexible display using an orientation module, wherein the touchscreen control module can reconfigure the touchscreen based on the orientation determined from the orientation module.

14. The method of claim 11, wherein the touchscreen is reconfigured to include at least one null area along at least one side of the main housing.

15. The method of claim 11, wherein the touchscreen is reconfigured to include at least one activator along at least one side of the main housing, wherein the at least one activator is a volume control activator.

16. The method of claim 11, further comprising:
    wrapping the flexible display around the main housing such that the flexible display covers at least one side of the main housing and the touchscreen includes at least one activator and at least one null area on the at least one side.

17. An electronic device, comprising:
a rigid main housing;
a flexible display at least partially over the main housing, wherein a display side of the flexible display faces away from the main housing, wherein the flexible display can wrap around the main housing;
a touchscreen;
an orientation module, wherein the orientation module can determine the orientation of the flexible display;
a strain gage to determine when the flexible display is wrapped around the main housing; and
a touchscreen control module separate and independent from a central processor of the electronic device, wherein the touchscreen control module can reconfigure the touchscreen based on the orientation determined from the orientation module, wherein the reconfiguration includes reconfiguring at least a portion of a first area of the touchscreen from an active area to a null area, wherein the touchscreen control module detects touch input on the touchscreen, wherein when the electronic device is in a low power state, touch input in the null area is not communicated to the central processor of the electronic device for processing.

18. The electronic device of claim 17, wherein the touchscreen is reconfigured to include null areas along a first side of the main housing when the flexible display is wrapped around the main housing and both at least one activator and null areas along a second side of the main housing when the flexible display is wrapped around the main housing, wherein the at least one activator includes a volume control activator.

19. The electronic device of claim 17, wherein the flexible display is wrapped around the main housing such that the flexible display covers at least one side of the main housing and the touchscreen includes at least one activator and at least one null area on the at least one side.

20. A system, comprising:
a rigid main housing;
a flexible display at least partially over the main housing, wherein the flexible display includes a display screen and the display screen faces away from the main housing, wherein the flexible display can wrap around the main housing, wherein the flexible display includes a touchscreen;
a strain gage to determine when the flexible display is wrapped around the main housing;
an orientation module configured to determine the orientation of the flexible display; and
a touchscreen control module separate and independent from a central processor of the system, wherein the touchscreen control module is configured to:
detect touch input on the touchscreen;
reconfigure the flexible display based on the orientation determined from the orientation module; and
reconfigure the touchscreen based on the reconfigured flexible display, wherein the reconfiguration of the touchscreen includes reconfiguring at least a portion of a first area of the touchscreen from an active area to a null area, wherein when the system is in a low power state, touch input in the null area is not communicated to the central processor of the system for processing.

21. The system of claim 20, wherein the display screen can be reconfigured based on an orientation of the flexible display.

22. The system of claim 20, wherein the touchscreen is reconfigured to include null areas along a first side of the main housing when the flexible display is wrapped around the main housing and both at least one activator and null areas along a second side of the main housing when the flexible display is wrapped around the main housing, wherein the at least one activator includes a volume control activator.

23. The system of claim 20, wherein the touchscreen control module is further configured to cause the processor to reconfigure the touchscreen to include at least one activator and at least one null area on at least one side of the main housing.

* * * * *